US008565967B2

(12) United States Patent
Steiner

(10) Patent No.: US 8,565,967 B2
(45) Date of Patent: Oct. 22, 2013

(54) ACCELERATION DETECTION AND ANGULAR POSITION DETERMINATION SYSTEMS AND METHODS IN TIRE PRESSURE MONITORING SYSTEMS

(75) Inventor: Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 48 days.

(21) Appl. No.: 13/332,910

(22) Filed: Dec. 21, 2011

(65) Prior Publication Data

US 2013/0166140 A1 Jun. 27, 2013

(51) Int. Cl.
G01M 17/00 (2006.01)
(52) U.S. Cl.
USPC .......................................... 701/34.4
(58) Field of Classification Search
USPC ........................................... 701/34
See application file for complete search history.

(56) References Cited

U.S. PATENT DOCUMENTS

| 5,247,831 | A | 9/1993 | Floravanti |
| 5,749,984 | A | 5/1998 | Frey et al. |
| 6,112,587 | A | 9/2000 | Oldenettel |
| 6,208,949 | B1* | 3/2001 | Eatwell .......................... 702/189 |
| 6,278,361 | B1* | 8/2001 | Magiawala et al. ............ 340/438 |
| 6,507,804 | B1* | 1/2003 | Hala et al. ...................... 702/182 |
| 6,604,416 | B2* | 8/2003 | Tsujita ........................... 73/146.5 |
| 6,917,887 | B2* | 7/2005 | Henry et al. .................... 702/45 |
| 7,010,968 | B2 | 3/2006 | Stewart et al. |
| 7,227,458 | B2* | 6/2007 | Watabe et al. ................. 340/447 |
| 7,313,952 | B2 | 1/2008 | Brusarosco et al. |
| 7,336,161 | B2 | 2/2008 | Walraet |
| 7,412,879 | B2 | 8/2008 | Serra et al. |
| 7,417,536 | B2* | 8/2008 | Lakshmanan et al. ......... 340/538 |
| 7,443,288 | B2* | 10/2008 | Dunbridge et al. ............ 340/444 |
| 7,536,903 | B2 | 5/2009 | Schillinger et al. |

(Continued)

FOREIGN PATENT DOCUMENTS

| EP | 0887211 | 12/1998 |
| EP | 1293362 | 3/2003 |

(Continued)

OTHER PUBLICATIONS

Victor Kalinin, "Wireless Physical SAW Sensors for Automotive Applications", 2011, IEEE.*

(Continued)

Primary Examiner — Thomas Tarcza
Assistant Examiner — Alex C Dunn
(74) Attorney, Agent, or Firm — Patterson Thuente Pedersen, P.A.

(57) ABSTRACT

Embodiments relate to tire pressure monitoring systems (TPMS). In embodiments, a TPMS comprises a wheel unit and a control unit. Each wheel unit collects acceleration data and uses that data to determine a time at which the wheel unit will be at an angular position desired for signal transmission. Embodiments also include systems and methods for detecting vehicle acceleration by wheel units and determining robustness of acceleration data with respect to noise and vehicle acceleration.

25 Claims, 6 Drawing Sheets

(56) References Cited

U.S. PATENT DOCUMENTS

| | | | |
|---|---|---|---|
| 7,546,764 B2 | 6/2009 | Morinaga et al. | |
| 7,557,697 B2 * | 7/2009 | Bauer | 340/440 |
| 7,558,686 B1 * | 7/2009 | Morello | 702/67 |
| 7,673,505 B2 | 3/2010 | Hammerschmidt | |
| 7,693,626 B2 * | 4/2010 | Breed et al. | 701/34.4 |
| 7,930,132 B2 | 4/2011 | Watasue | |
| 8,255,117 B2 * | 8/2012 | Bujak et al. | 701/37 |
| 8,332,092 B2 * | 12/2012 | Laermer et al. | 701/29.1 |
| 2003/0058118 A1 | 3/2003 | Wilson | |
| 2005/0150284 A1 | 7/2005 | Hernando | |
| 2006/0087420 A1 | 4/2006 | Walraet | |
| 2007/0107505 A1 | 5/2007 | Schillinger et al. | |
| 2008/0243334 A1 * | 10/2008 | Bujak et al. | 701/37 |
| 2010/0030512 A1 | 2/2010 | Hoeffel | |
| 2011/0071737 A1 | 3/2011 | Greer | |

FOREIGN PATENT DOCUMENTS

| | | |
|---|---|---|
| EP | 1832881 | 9/2007 |
| WO | WO 2009/060093 | 5/2009 |
| WO | WO2011/085878 | 7/2011 |

OTHER PUBLICATIONS

Liu Bo, Zhang Qi, Liu Guofu, Xie Xiufen, "Non-uniform Sampling Signal Spectral Estimation of Tire Pressure Monitoring System Using Wavelet Transform", 2007, IEEE.*

Zhiping Jiang, Huachun Liu, Qingguang Dai, "A New Intelligent Tire Pressure Monitoring System", 2011, IEEE.*

Application and File History for U.S. Appl. No. 12/131,951, filed Jun. 3, 2008. Inventors: Gotschlich et al.

Application and File History for U.S. Appl. No. 13/022,345, filed Feb. 7, 2011. Inventors: Gotschlich et al.

* cited by examiner

ACCELERATION DETECTION AND ANGULAR POSITION DETERMINATION SYSTEMS AND METHODS IN TIRE PRESSURE MONITORING SYSTEMS

TECHNICAL FIELD

The invention relates generally to tire pressure monitoring systems (TPMS) and more particularly to systems and methods for detecting vehicle acceleration by a wheel module and determining an angular position of the wheel module during vehicle motion.

BACKGROUND

Tire pressure monitoring systems (TPMS) on vehicles are generally required in the U.S., with Europe and countries in Asia to follow. The legislation mandating the use of TPMS typically sets a pressure warning threshold level which is monitored by wheel-based units, or wheel modules, in direct TPMS. The wheel modules are mounted inside of each tire, such as on the rim, valve, or in-tire, in order to periodically or continuously monitor the inflation pressure of the tire.

Each wheel module typically includes a pressure sensor, control logic such as a microcontroller, a power source such as a battery, and a radio frequency (RF) transmitter that communicates information from the wheel module to a central TPMS receiver mounted elsewhere in the vehicle. Some wheel modules also comprise an acceleration sensor for determining when the vehicle is in motion in order to conserve battery life.

There are significant power constraints on the wheel modules. For example, a typical wheel module should be able to operate with the same battery for at least five years. Such demands make prolonged wheel module operation or operation when data cannot or should not be detected undesirable and increase the need for efficient communications between wheel modules and a central receiver.

Therefore, there is a need for improved operation and communication techniques in TPMS system wheel modules.

SUMMARY

Embodiments relate to acceleration detection and angular determination in tire pressure monitoring systems.

In an embodiment, a method comprises estimating an oscillation frequency from an acceleration signal sample from a sensor in a tire pressure monitoring system (TPMS) wheel module to determine a sampling period; acquiring a plurality of acceleration signal samples from the sensor according to the sampling period; and determining a final oscillation frequency estimate and a phase angle estimate from the plurality of acceleration signal samples.

In an embodiment, a wheel unit of a tire pressure monitoring system comprises a pressure sensor; an acceleration sensor; and a microcontroller coupled to the pressure and acceleration sensors and configured to determine a sampling period for the acceleration sensor from a single acceleration sensor signal sample, sample the acceleration sensor according to the sampling period to obtain a plurality of acceleration sensor signal samples and estimate an angular position of the wheel unit from the plurality of acceleration sensor signal samples.

In an embodiment, a tire pressure monitoring system comprises at least one wheel unit mounted in a tire of a vehicle and comprising a pressure sensor, an acceleration sensor, a microcontroller coupled to the pressure and acceleration sensors and configured to determine a sampling period for the acceleration sensor from a single acceleration sensor signal sample, sample the acceleration sensor according to the sampling period to obtain a plurality of acceleration sensor signal samples and estimate an angular position of the wheel unit from the plurality of acceleration sensor signal samples, and a communications unit configured to communicate data comprising pressure sensor data signals from the wheel unit at a transmission time corresponding to a desired transmission angle extrapolated from the estimated angular position; and a central receiver unit mounted in the vehicle and configured to receive the data communicated by the at least one wheel unit.

BRIEF DESCRIPTION OF THE DRAWINGS

The invention may be more completely understood in consideration of the following detailed description of various embodiments of the invention in connection with the accompanying drawings, in which.

Figure 1:
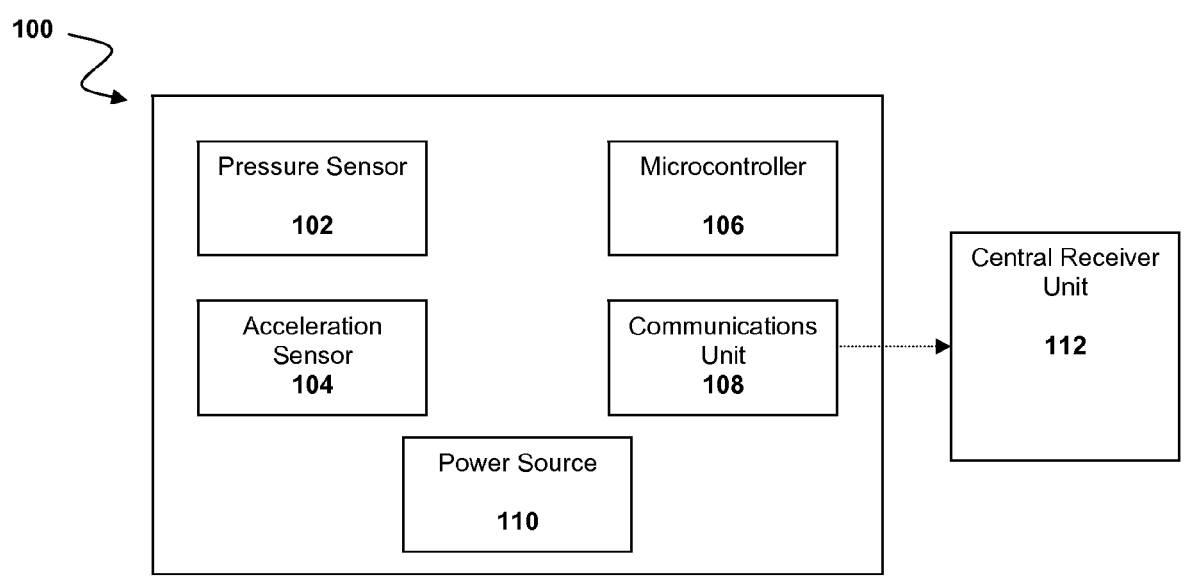
FIG. 1 is a block diagram of a tire pressure monitoring system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to tire pressure monitoring systems (TPMS). In embodiments, a TPMS comprises a wheel unit and a control unit. Each wheel unit collects acceleration data and uses that data to determine a time at which the wheel unit will be at an angular position desired for signal transmission. Embodiments also include systems and methods for detecting vehicle acceleration by wheel units and determining robustness of acceleration data with respect to noise and vehicle acceleration.

FIG. 1 depicts a wheel module according to an embodiment. Wheel module 100 comprises a pressure sensor 102, an acceleration sensor 104, control circuitry such as a microcontroller 106, a communications unit 108 and a power source 110 in an embodiment.

Pressure sensor 102 is used to monitor the pressure of the tire by periodically sensing the pressure. Acceleration sensor 104 can be used to detect rotation, which helps to reduce power consumption by only taking pressure measurements when the vehicle is in motion. In embodiments, acceleration sensor 104 is a single-axis or a multi-axis acceleration sensor with sensitivity in the radial direction, orthogonal to the axis of the vehicle (see FIG. 2), though other acceleration sensors can be used in other embodiments.

Communications unit 108 comprises a radio frequency (RF) transmitter in one embodiment to transmit signals to a central receiver unit 112. In a unidirectional TPMS embodiment, module 100 is autonomous in that it transmits to but does not receive wireless communications from central receiver unit 112, reducing power consumption. In other embodiments, communications unit 108 can comprise an RF transmitter/receiver or some other wireless communications module and can be separate from (as depicted) or integrated with microcontroller 106 in embodiments. Power source 110 comprises a battery or other suitable power source in embodiments.

In embodiments, wheel module 100 can comprise more or fewer components. For example, wheel modules 100 can comprise a temperature sensor in order to provide temperature compensation. Additional sensors, such as to monitor other characteristics of the tire, wheel, and environment, can also be included in other embodiments. Further, in other embodiments, wheel module 100 may have various components located in positions discrete from the rest of components of wheel module 100, depending on the application and component.

Figure 2:
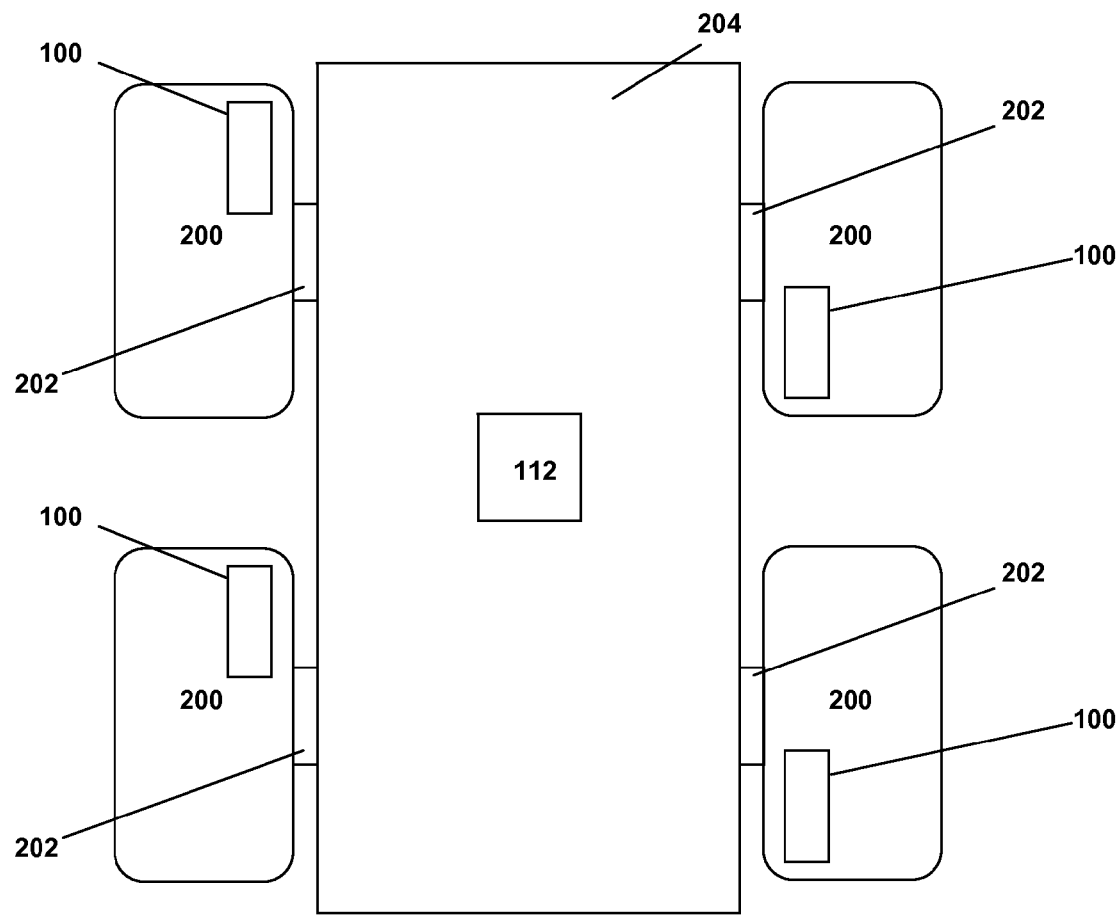
FIG. 2 is a block diagram of a vehicle according to an embodiment.

Referring to FIG. 2, wheel module 100 can be mounted in a tire 200, and each individual tire 200 is mounted to vehicle body 204 via axle 202. In embodiments, wheel module 100 can be mounted to the rim, valve stem, or in-tire. A typical passenger vehicle having four wheels will therefore have four wheel modules, one in each tire 200, as shown generally in FIG. 2, thus enabling each wheel module 100 to monitor the tire pressure of the tire associated with the wheel in which it is mounted. The mounting position of each wheel module 100 in each tire 200 can be the same or can vary in embodiments.

Figure 3A:
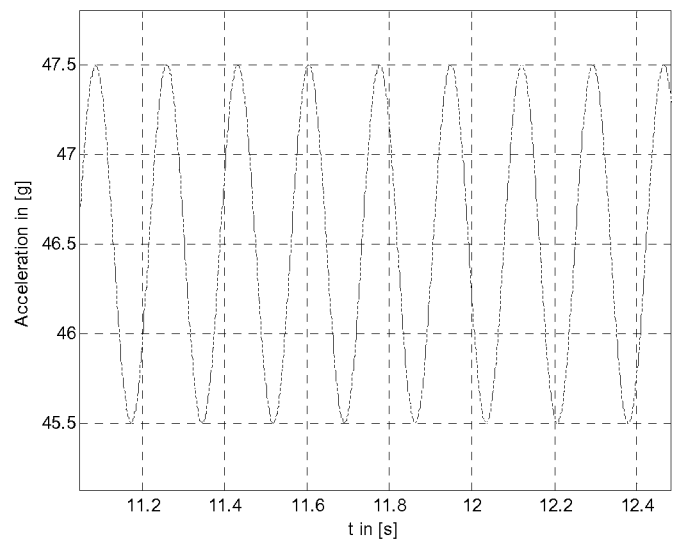
FIG. 3A is a graph of a radial acceleration signal of a rotating tire over time according to an embodiment.
Figure 3B:
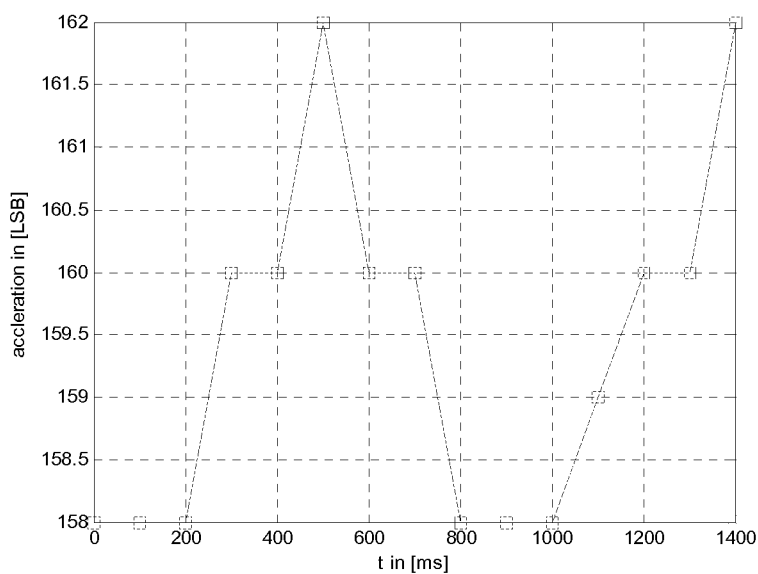
FIG. 3B is a graph of digitized acceleration samples over time according to an embodiment.

In operation, when tire 200 is rotating, acceleration sensor 104 senses the acceleration due to the centrifugal force. Sensor 104 also senses an acceleration component due to Earth's gravity field. This acceleration component oscillates as tire 200 rotates. The amplitude of this oscillating signal is 1 $g=9.81$ m/s$^2$. The frequency of the oscillating signal is equal to the rotations per second of tire 200. The phase of the oscillating signal is related to the angular position of wheel module 100. FIG. 3 depicts a typical acceleration signal with an oscillating signal on top of a constant acceleration value due to the centrifugal force. In the example depicted in FIG. 3A, tire 200 is rotating with a constant frequency, i.e. the vehicle is driving with constant speed.

This analog signal can be sampled and quantized to obtain digitized acceleration samples for further processing. Since the radial acceleration due to the centrifugal force can reach hundreds of g's, and the analog-to-digital (A/D) converter typically will have only a small number of bits, such as ten bits in one embodiment, the resolution of the oscillation signal can be poor, as depicted in the digitized samples of the acceleration on FIG. 3B.

It is desired to determine the angular position of wheel module 100 at a particular instant of time, which can be accomplished in embodiments from digitized acceleration samples. Knowing this, each wheel module 100 can be configured to transmit its sensor data packet at a preset rotational angle or position to achieve more successful and/or efficient communications with a central receiver 112. For such an extrapolation of the position of wheel module 100, the position of wheel module 100 at a given instant of time and the frequency of the tire estimation can be estimated from the acceleration samples. Conventional approaches have suffered from challenges related to poor resolution of the acceleration signal and limited processing power, as previously mentioned, as well as environmental noise.

In embodiments, however, these challenges can be overcome and the angular position of wheel module 100 at a particular instant of time can be estimated and extrapolated such that wheel module 100 can be configured to transmit sensor data packets at a particular tire rotation angle. In embodiments, a number N of digitized acceleration samples with low resolution is used.

Figure 4:
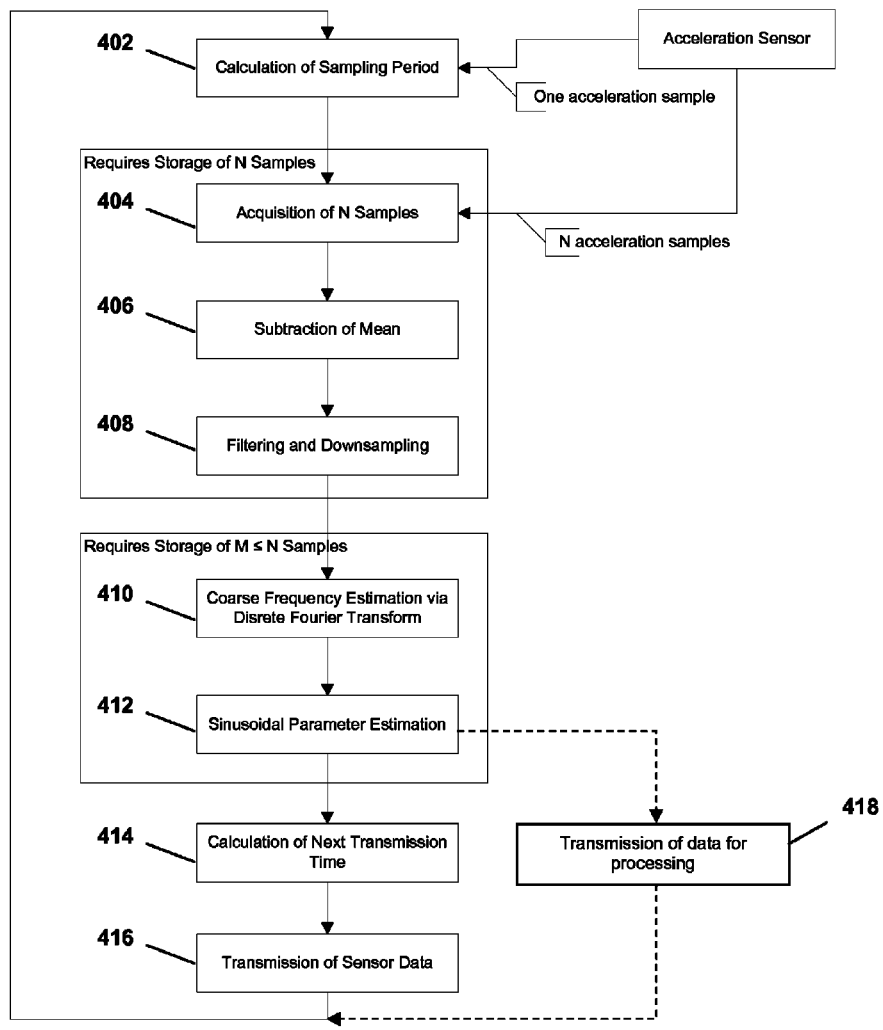
FIG. 4 is a flowchart of a method according to an embodiment.

Referring to FIG. 4, a flow chart of an embodiment of a method for estimating the angular position of a wheel module 100 is depicted.

At 402, a sampling period for acquisition of acceleration samples is determined. In embodiments, subsequent steps can require an observation of several periods of the oscillating acceleration signal. Since the frequency of oscillation is directly proportional to the speed of the vehicle, the sampling period has to be adapted to the actual speed of the car. This adaptation is done with a single acceleration sample and exploits the fact that the centrifugal acceleration depends on the oscillation frequency, or the speed of the vehicle. Hence, the period of oscillation is estimated based on this acceleration sample in embodiments. With this estimate and the total number of samples to acquire (N), the sample period can be determined.

At 404, N samples are acquired. The samples can also be digitized and stored in embodiments. The N acceleration samples are referred to as the acceleration vector. The time between each acceleration sample is equal to the sampling period, in embodiments in which uniform sampling is carried out. The values of the acceleration samples can be quantized to a certain number of bits, for example 10 bits in an embodiment. The observation window, which is given by N−1 times the sampling period, covers several periods of the oscillation. The time of the middle sample is denoted as t0 and is called the reference time.

At 406, the centrifugal acceleration component causes a mean (DC) of the acceleration vector, which is irrelevant in embodiments for the subsequent tasks. Hence, the mean can be subtracted at 406.

At 408, optional filtering and downsampling can be performed. The acceleration vector can be filtered in order to improve the signal-to-noise (S/N) ratio. The term "noise" subsumes environmental and quantization noise. The tradeoff between performance improvement and increased processing time can be considered in embodiments, and these tasks can be included or omitted. After filtering, the acceleration vector can be downsampled to decrease processing time of subsequent tasks.

At 410, a coarse frequency estimate, denoted by f1, can be obtained by calculating a discrete Fourier transform (DFT). In embodiments, only selected frequency bins are evaluated. Since the sampling period is adapted to the speed of the vehicle, this selection of frequency bins is independent of the actual oscillation frequency (i.e., the speed of the vehicle) and can be kept fixed.

The frequency bin with the maximum absolute DFT value can be used to calculate the estimate f1 in one embodiment. The estimation accuracy is influenced by the frequency resolution of the DFT, i.e., by the bin size. Here, the trade-off between frequency resolution (accuracy) and processing time can be considered in embodiments.

After 410 and before 412, an additional, optional, step can be added in embodiments to evaluate robustness criterion in order to prevent an incorrect extrapolation of the angular position of the wheel module due to acceleration samples influenced by noise or vehicle acceleration. In this step, the maximum-to-average ratio of the absolute (and squared) DFT values is compared to a threshold. The maximum absolute DFT value was calculated at 410, as discussed above, so only the average over all absolute and squared DFT values additionally has to be determined. A small maximum-to-average ratio indicates that no clean single frequency is present in the acceleration samples. In this case, the acquired acceleration samples are most likely corrupted by noise or vehicle acceleration. Thus, if the maximum-to-average ratio is below a selected threshold, then the current acceleration samples are disregarded, and the algorithm of FIG. 4 is stopped and restarted at 402.

At 412, the coarse (initial) frequency estimate f1 is used to be able to apply a low complexity iterative method for sinusoidal parameter estimation. This algorithm is based on a sinusoidal data model. The model is linearized around f1, where the true frequency f is given by $f=f1+\Delta f$, and $\Delta f$ is a small and unknown frequency deviation. With this linearization, functions of the unknown sinusoidal parameters (amplitude, $\Delta f$ and phase $\phi(t0)$) are related to the acceleration vector via a matrix equation. Consequently, well-known solution methods based on least squares can be applied.

The outputs of this algorithm are estimates for the amplitude, $\Delta f$ and $\phi(t0)$, i.e., phase at time t0. Time t0, the reference time, can be, for example, the time of the middle acceleration sample in an embodiment. Thus, the final frequency estimate can be given by $f=f1+\Delta f$. The final frequency estimate f and the phase estimate are used at 414 to calculate the time for the next transmission of sensor data.

At 414, the transmission time is calculated. The phase estimate $\phi(t0)$ is related to the angular position of wheel module at the reference time t0. The time difference $\Delta t$, until the wheel module reaches the desired transmission angle $\alpha$, can be computed with $\phi(t0)$, f and $\alpha$. Theoretically, the next transmission time would be $t0+\Delta t$.

It should be considered, however, that the acquisition of N samples and the calculations of 406 and 412 require processing time. The time instant when 412 is complete is denoted by t1. In embodiments, the time instant t1 will be after $t0+\Delta t$, i.e., $t1>t0+\Delta t$. Hence, a sequence of possible transmission points $t[k]=t0+\Delta t+k/f$, with k as an integer greater than zero, is calculated and stored in embodiments. At time instant t1, i.e., right after 412, the next future transmission time can be selected. Then, the wheel module waits until this time instant is reached and then transmits its sensor data at 416.

In another embodiment, and in an alternate to 414 shown at 418, all processing steps are completed at time t1 and the wheel unit ID, $\phi(t0)$ and the elapsed processing time t1-t0 are transmitted with the sensor data by the wheel module to the central receiver. The central receiver can use this information in a comparison with ABS data in embodiments. In contrast with 414, there is no predefined transmission angle, and the wheel module need not wait prior to data transmission. Furthermore, the frequency estimate is not needed. The TPMS protocol is changed, however, in order to include $\phi(t0)$ and t1-t0 in the transmitted datagram. The datagram or signal can have a variety of formats, such that in one embodiment, the additional data can be encoded on top of the customary signal.

Embodiments of the method of FIG. 4 can be enhanced by incorporating vehicle acceleration detection into the wheel modules. As previously mentioned, the acceleration due to centrifugal force is related to the vehicle speed. If the vehicle is accelerating or braking, the output of the acceleration sensor will increase or decrease respectively. Therefore, a change of vehicle speed can be detected by observation of the output of the acceleration sensor.

Figure 5:
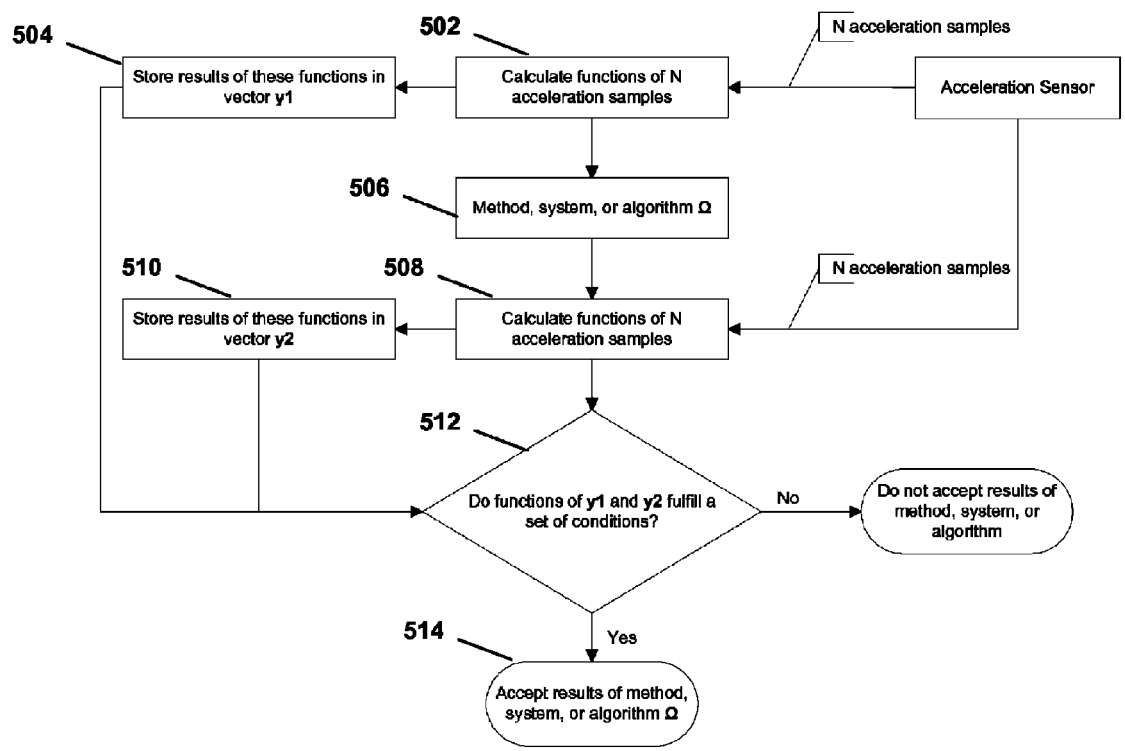
FIG. 5 is a flowchart of a method according to an embodiment.

Referring to FIG. 5, at 502 the results of a set of functions of N acceleration samples are calculated. These results can be stored in a vector y1 at 504.

At 506, another method, system or algorithm, denoted by $\Omega$, can be executed. In embodiments, the method can be, for example, the method of FIG. 4 or any other method, system or algorithm in which constant vehicle speed is required or desired. At 508, the results of the same set of functions of another N acceleration samples are calculated, and stored in a vector y2 at 510.

At 512, functions of y1 and y2 are evaluated to see whether they fulfill a set of conditions. For example, in an embodiment the number of measured acceleration samples is N=1. The only function to be calculated is the identity function. Therefore, y1 and y2 are each a single acceleration sample. The function of y1 and y2 at 512 is, for example, |y1-y2|, and the condition to be checked is whether $|y1-y2|<\Delta$. If the absolute value of the difference of the samples is smaller than a predetermined threshold $\Delta$, then the results of $\Omega$ are accepted. If the conditions are fulfilled, the results are accepted at 514.

Figure 6:
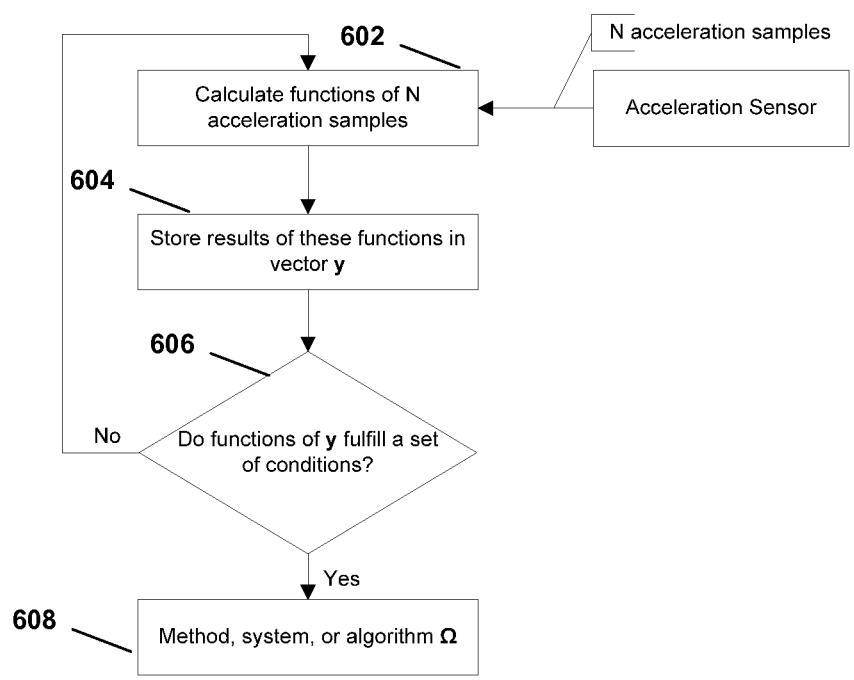
FIG. 6 is a flowchart of a method according to an embodiment.

Referring to FIG. 6, another embodiment uses a single vector y. At 602, the results of a set of functions of N acceleration samples are calculated. The duration between acquisition of two subsequent acceleration samples is larger than zero.

At 604, the results are stored in a vector y. Then, at 606, y is evaluated to see whether it fulfills a set of conditions. For example, the number of acceleration samples is larger than one, i.e., N>1. The set of functions comprises Minimum and Maximum, and the condition to be checked at 606 is whether Maximum(y)−Minimum(y)$<\Delta$, where $\Delta$ is a predetermined threshold. If the difference between the largest acceleration sample (Maximum) and the smallest acceleration sample (Minimum) is less than the threshold $\Delta$, then the other method, system or algorithm $\Omega$ is executed at 608. If not, the process is repeated after some time beginning with 602.

An advantage of embodiments is that accurate results can be achieved with a small number of acceleration samples, and/or despite large quantization or environmental noise. Moreover, the processing can be performed by a standard microcontroller, such as an 8051-based microcontroller used in TPMS wheel modules, in a short amount of time.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method comprising:
   estimating an oscillation frequency from an acceleration signal sample from a sensor in a tire pressure monitoring system (TPMS) wheel module to determine a sampling period;
   acquiring a plurality of acceleration signal samples from the sensor according to the sampling period; and
   determining a final oscillation frequency estimate and a phase angle estimate from the plurality of acceleration signal samples.

2. The method of claim 1, further comprising calculating a next transmission time from the final oscillation frequency estimate and the phase angle estimate.

3. The method of claim 1, further comprising transmitting sensor data by the TPMS wheel unit at the next transmission time.

4. The method of claim 1, further comprising determining an elapsed time related to the acquiring and the determining.

5. The method of claim 4, further comprising transmitting sensor data, the phase angle estimate and the elapsed time from the TPMS wheel module to a central receiver.

6. The method of claim 5, further comprising using the sensor data, the phase angle estimate and the elapsed time by the central receiver in a comparison with information from another vehicle system.

7. The method of claim 6, wherein the another vehicle system comprises an antilock braking system (ABS).

8. The method of claim 1, wherein estimating an oscillation frequency further comprising estimating the oscillation frequency from a single acceleration signal sample.

9. The method of claim 1, further comprising forming an acceleration vector from the plurality of acceleration signal samples.

10. The method of claim 9, further comprising subtracting a mean component from the acceleration vector.

11. The method of claim 9, further comprising filtering the acceleration vector.

12. The method of claim 11, further comprising downsampling the acceleration vector.

13. The method of claim 1, wherein determining a final oscillation frequency estimate and a phase angle estimate further comprises:
   obtaining a coarse frequency estimate by calculating a discrete Fourier transform (DFT) of the plurality of acceleration signal samples and using a frequency bin of the DFT having a maximum absolute DFT value; and
   obtaining the final oscillation frequency estimate and the phase angle estimate from the coarse frequency estimate using a least squares optimization.

14. The method of claim 13, wherein calculating a next transmission time further comprises utilizing the final oscillation frequency estimate and the phase angle estimate to extrapolate an angular position of the wheel module.

15. The method of claim 14, wherein calculating a next transmission time further comprises determining a plurality of possible transmission points to account for processing time, and selecting the next transmission time from the plurality of possible transmission points after processing.

16. The method of claim 13, wherein determining a final oscillation frequency estimate and a phase angle estimate further comprises comparing a maximum-to-average ratio of the DFT values to a threshold, and discarding the plurality of acceleration signal samples if the ratio is below the threshold.

17. The method of claim 1, further comprising detecting vehicle acceleration by comparing at least one function of an acceleration vector to a threshold.

18. The method of claim 17, wherein detecting vehicle acceleration further comprises comparing an absolute value of a difference between two acceleration signal samples to the threshold.

19. The method of claim 17, wherein detecting vehicle acceleration further comprises comparing a difference between a maximum acceleration signal sample and a minimum acceleration signal sample to the threshold.

20. A wheel unit of a tire pressure monitoring system comprising:
   a pressure sensor;
   an acceleration sensor; and
   a microcontroller coupled to the pressure and acceleration sensors and configured to determine a sampling period for the acceleration sensor from a single acceleration sensor signal sample, sample the acceleration sensor according to the sampling period to obtain a plurality of acceleration sensor signal samples and estimate an angular position of the wheel unit from the plurality of acceleration sensor signal samples.

21. The wheel unit of claim 20, further comprising a communications unit configured to communicate pressure sensor data signals from the wheel unit.

22. The wheel unit of claim 21, wherein the communication unit is configured to communicate pressure sensor data signals at a transmission time corresponding to a desired transmission angle extrapolated from the estimated angular position.

23. The wheel unit of claim 21, wherein the communications unit is configured to communicate data from the microcontroller related to a phase angle estimate and an elapsed processing time with the pressure sensor data signals.

24. The wheel unit of claim 21, wherein the communications unit is configured to communicate to a central receiver unit.

25. A tire pressure monitoring system comprising:
   at least one wheel unit mounted in a tire of a vehicle and comprising a pressure sensor, an acceleration sensor, a microcontroller coupled to the pressure and acceleration sensors and configured to determine a sampling period for the acceleration sensor from a single acceleration sensor signal sample, sample the acceleration sensor according to the sampling period to obtain a plurality of acceleration sensor signal samples and estimate an angular position of the wheel unit from the plurality of acceleration sensor signal samples, and a communications unit configured to communicate data comprising pressure sensor data signals from the wheel unit at a transmission time corresponding to a desired transmission angle extrapolated from the estimated angular position; and
   a central receiver unit mounted in the vehicle and configured to receive the data communicated by the at least one wheel unit.

* * * * *